United States Patent [19]

Doemen

[11] Patent Number: 4,542,323

[45] Date of Patent: Sep. 17, 1985

[54] DIRECT CURRENT MOTOR WITHOUT COMMUTATOR

[75] Inventor: Benno Doemen, St. Georgen, Fed. Rep. of Germany

[73] Assignee: Papst Motoren GmbH & Co KG, St. Georgen, Fed. Rep. of Germany

[21] Appl. No.: 499,670

[22] Filed: Jun. 1, 1983

Related U.S. Application Data

[63] Continuation of Ser. No. 287,061, Jul. 27, 1981, abandoned, which is a continuation of Ser. No. 40,276, May 18, 1979, abandoned.

[30] Foreign Application Priority Data

May 22, 1978 [DE] Fed. Rep. of Germany ....... 2822315

[51] Int. Cl.[4] ........................................... H02K 29/00
[52] U.S. Cl. .................................... 318/254; 318/138
[58] Field of Search ............... 318/138, 254, 314, 341, 318/345, 346, 356, 439, 503, 505, 506, 519, 532, 536

[56] References Cited

U.S. PATENT DOCUMENTS

| 3,383,574 | 5/1968 | Manteuffel | 318/138 |
| 3,719,870 | 3/1973 | Bregeault | 318/138 |
| 3,873,897 | 3/1975 | Müller | 318/138 |
| 3,898,544 | 8/1975 | Tanikoshi | 318/254 |
| 4,134,030 | 1/1979 | Pace | 318/254 A |

FOREIGN PATENT DOCUMENTS

| 2452082 | 6/1976 | Fed. Rep. of Germany | 318/138 |
| 2804561 | 8/1979 | Fed. Rep. of Germany | 318/138 |

OTHER PUBLICATIONS

Motorola, "Silicon Zener Diode and Rectifier Handbook", 1964; pp. 23–26.

Primary Examiner—B. Dobeck
Attorney, Agent, or Firm—Michael J. Striker

[57] ABSTRACT

A commutatorless DC motor with an armature, a detector for sensing the position of the armature, a motor winding arrangement for supplying current via a bridge network, the network being controlled by semiconductor switches that act in dependence upon the armature position.

6 Claims, 8 Drawing Figures

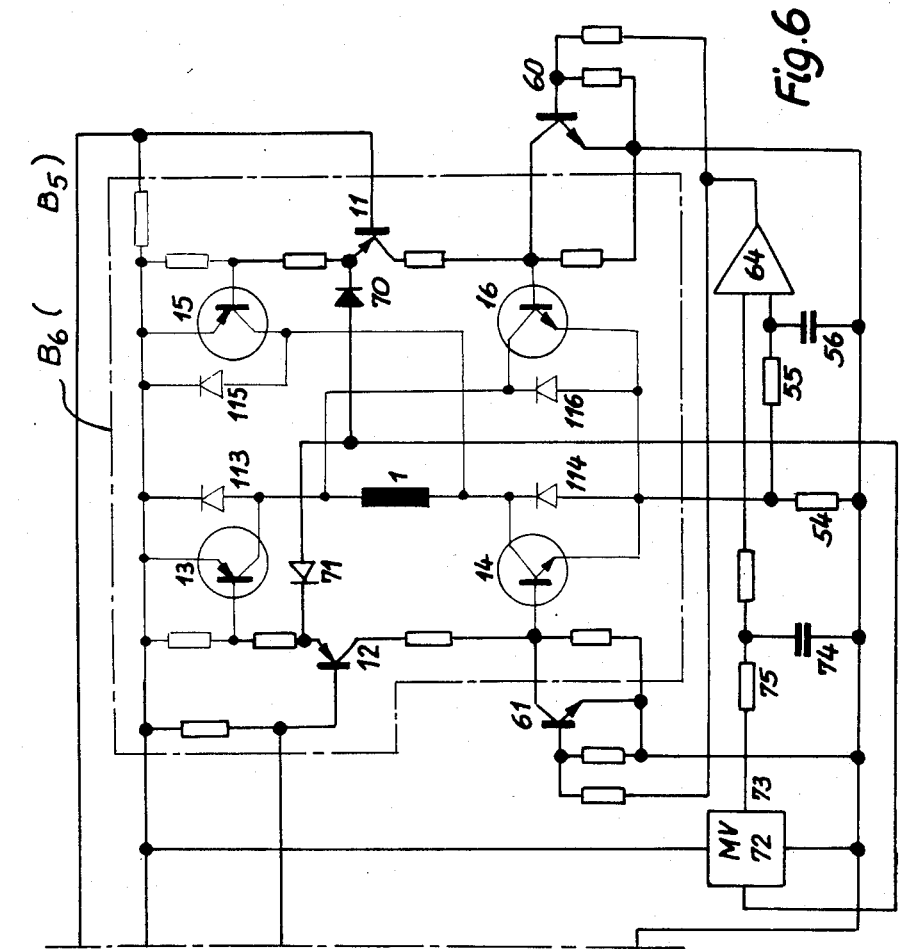
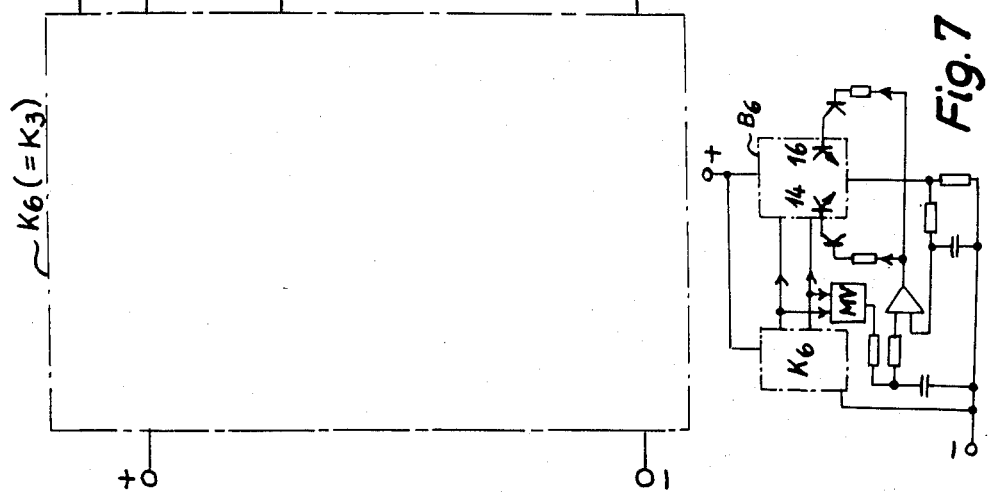

DIRECT CURRENT MOTOR WITHOUT COMMUTATOR

CROSS-REFERENCE TO RELATED APPLICATIONS

This application is a continuation of application Ser. No. 287,061 filed July 27, 1981 now abandoned which is a continuation of application Ser. No. 040,276 filed May 18, 1979 now abandoned.

BACKGROUND OF THE INVENTION

This invention relates to a direct-current motor without commutator, with an armature, a detector for the armature position, and a motor winding arrangement which is supplied with current via a bridge network controlled by semiconductor switches acting in dependence upon the armature position, and having a device for the reduction of the current in the bridge network during the period of commutation of the current of the motor winding arrangement.

Such motors are known from the German Letters Patent No. 1208 803 and from the German Publication of Specification No. 25 085 46. To avoid, with the motors as known, short circuits during the period of commutation of the stator currents, which would bring about an impermissible load of the semiconductor switches and the source of the direct voltage, the bridge network therein (German Publication of Specification No. 25 085 46) is provided with 1 or 2 semiconductor switches (German Letters Patent No. 1208 803) in series, which will block the current to the bridge network at the respective moment of commutation. This known device is effective and prevents short circuits and consequential damages caused thereby. It is, however, expensive since, apart from the respective control devices, additional heavy duty, and thus expensive, semiconductor switches are required for the blocking of the total current to the bridge network.

SUMMARY OF THE INVENTION

It is therefore one task of the invention to develop a direct-current motor without commutator of the type named afore in such a manner, that one the one hand blocking of the current to the bridge network during commutation of the current in the motor winding is ensured, and on the other, the design of the control circuit will, in toto, remain comparatively reasonably priced, even in operation at higher power outputs. Additional semiconductor switches designed for blocking of the total current of the bridge network should particularly be avoided. The commutating impulses should be prepared in an advantageous manner.

This tank is solved as per invention, by arranging a control stage between the armature-position detector and the semiconductor switches of the bridge network, the control stage transforming the output signals of the armature-positioning detector occurring in the range of transforming of the current into blocking signals for blocking the semiconductor switches and applying these blocking signals to all semiconductor switches of the bridge network in every case.

Since, due to the circuitry as per invention, the semiconductor switches of the bridge network become themselves blocked during commutation of the motor winding current, the desired blocking of current within the range of commutation can be obtained without the need for additional power transistors or similar heavy duty semiconductor switches. Since the semiconductor switches which are anyway required for the bridge network, are utilized for the blocking, one can furthermore make out with cheap control or drive transistors.

The design as per invention is, amongst others, particularly suitable for simply designed direct-current motors, as explained in detail in the German Letter of Disclosure 22 25 442.

The motor will suitably have an armature with permanent magnetism. The invention is of particular advantage when the motor is of a single or double pulse, that it is that its stator winding will generate an alternating field wherein a non electro dynamic (electro magnetic) auxiliary moment, preferably a so-called reluctance moment, will act on the rotor in the manner known per se, at least during the torque gaps. In the known manner, such a moment of reluctance can be achieved by suitable designing the sectional area of the stator iorn.

The stator may have only one single coil winding, wound in one direction. The invention is, however, also suitable for motors with two or more coils as known, for example from the German Letters Patent No. 12 08 803, or from the German Publication of Specification 25 08 546.

Additional details and further developments of the invention are evident from the following description of preferred examples of the design.

BRIEF DESCRIPTION OF THE DRAWINGS

FIG. 6 shows a commutator circuit as per FIG. 3 with stator-current limitation and speed regulation;

FIG. 7 is the arrangement as per FIG. 6 shown as functional schematic view

DETAILED DESCRIPTION OF THE PREFERRED EMBODIMENTS

Figure 1:
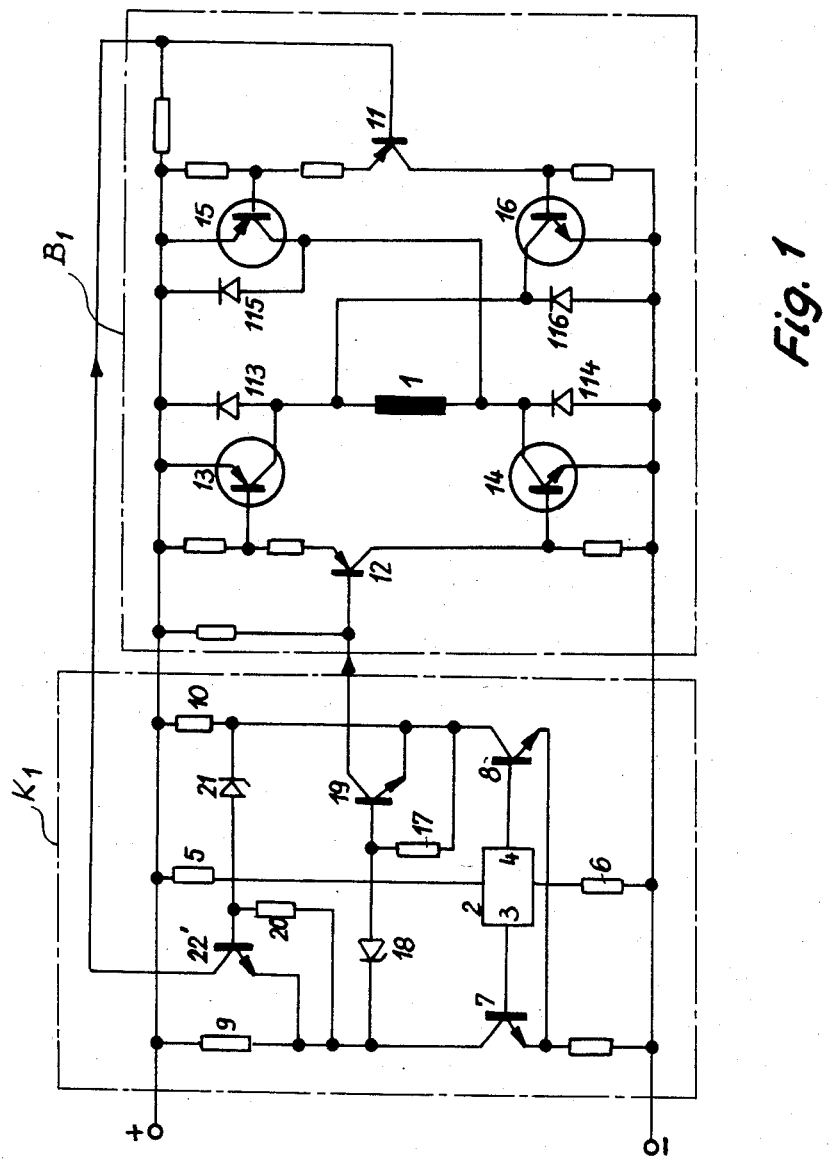
FIG. 1 shows a commutation circuit with a full semiconductor bridge and with Zener diode in the preamplifier for the preparation of the control voltage for the drive transistors.

FIG. 1 shows the circuitry for a two-pole direct current motor without commutator, with a permanently magnetic rotor, and a single-strand stator winding 1 in which a pure alternating field is generated. The Hall generator 2 is arranged in series with the resistors 5, 6 while the Hall generator outputs 3, 4 are directly connected to the base of the transistors 7, 8 of a differential amplifier. Signal changes in consequence of a changed rotor position, will lead to changes of the currents passing through the transistors 7, 8, and thus to alternating voltages at the resistors 9, 10. These voltages are not used directby for the control of the drive transistors 11, 12 and that final-stage transistor pairs 13, 14 and 15, 16 since, in the case of the full bridge as per FIG. 1, a sufficiently large time differential must be present between the blocking and the drive through signal. In order to prevent that one of the final transistor pairs stage is driven through, whilst the other is still under current. This desired staggering between the blocking and switching through of the transistor pairs 13, 14 or 15, 16 respectively, in the zone of the period of commutation is achieved between components 17, 18, 19 or 20, 21, 22' respectively, each consisting of a resistor 17 or 20 respectively, a Zener diode 18 or 21 respectively, and a transistor 19 or 22' respectively. The drive transistors 11, 12 are blocked immediately in every case when the potential difference at the resistors 9, 10 drops below the Zener voltage of the Zener diode 18 or 21 respectively, whilst for the driving through of a drive transistor, the potential difference must reach at least the value of the Zener voltage in order to switch through, via the transistor 19 or 22, respectively, the corresponding drive transistor 11 or 12, respectively and the final-stage transistor pairs 13, 14 or 15, 16, respectively.

To protect the transistors 13, 14, 15, 16 against peak voltages caused by changing of the final-stage transistors into the blocked state by transformation into electric energy of the magnetic energy stored in the stator winding 1, the diodes 113, 114, 115, 116 are arranged in parallel to the commutator emitter channels.

Figure 2:
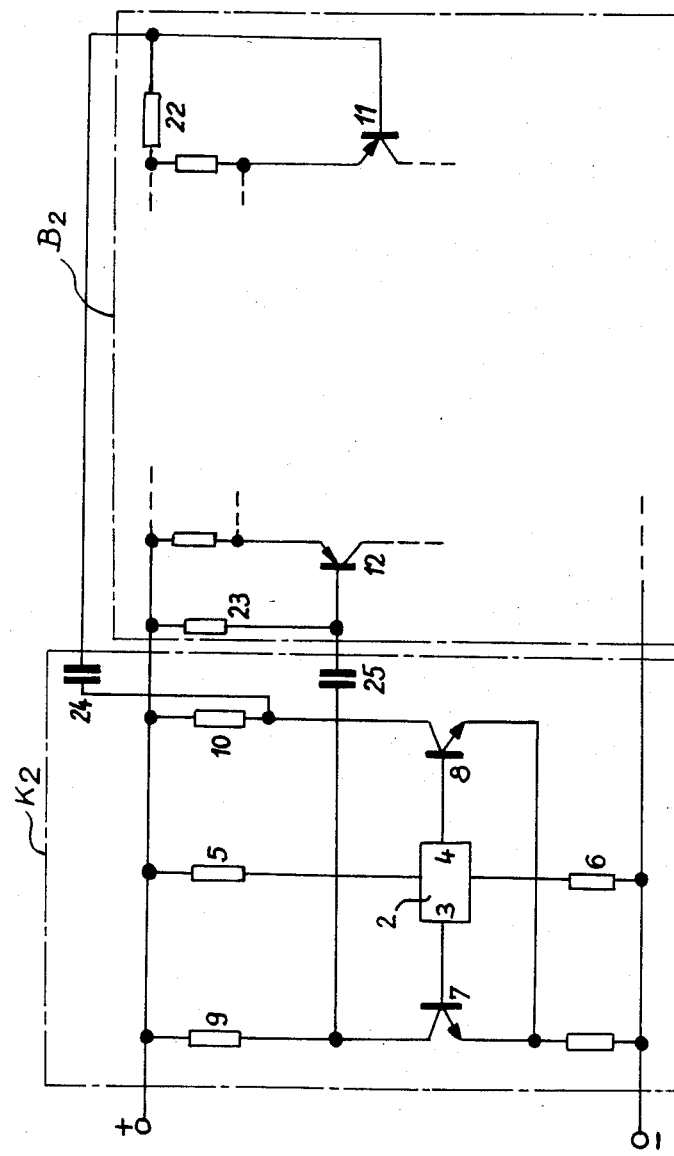
FIG. 2 illustrates a commutation circuit with drive transistors connected via capacitors.

In FIG. 2, the required time staggering between blocking and switching-through of the final stage transistor pairs 13, 14 or 15, 16 respectively, results from the driving voltage of the drive transistors 11, 12. In consequence of a charged rotor position and the voltage thus changed at the output 3, 4 of the Hall generator 2, the transistors 7, 8 are blocked alternatingly and switched through. A switching-through of the transistor 8 will cause, parallel to the resistor 10, a flow of current via the capacitor 24 and the resistor 23 and thus the switching through of the drive transistor 11 and the final stage transistor pairs 15, 16 assigned to it. Charging of the capacitor 24 ensuing during this time, will bring about an advanced blocking of the drive transistor 11 and the final stage transistor pair 15, 16, as soon as there is a drop in the Hall voltage at the output 4 of the Hall generator 2. This will occur before the transistor 7 and thus, via the capacitor 25 and the resistor 23, the drive transistor 12 as well as subsequently the final stage transistor pairs 13, 14 are driven through. During this time, the capacitor 24 will discharge via the resistors 10 and 22, so that after a further rotating movement of the rotor, the drop in the Hall voltage at the output 3 of the Hall generator 2 will block the transistor 7 and these steps can repeat themselves in alternating sequence. Thus, independently of the rotor position, current will flow through the stator winding in alternating directions.

Figure 3:
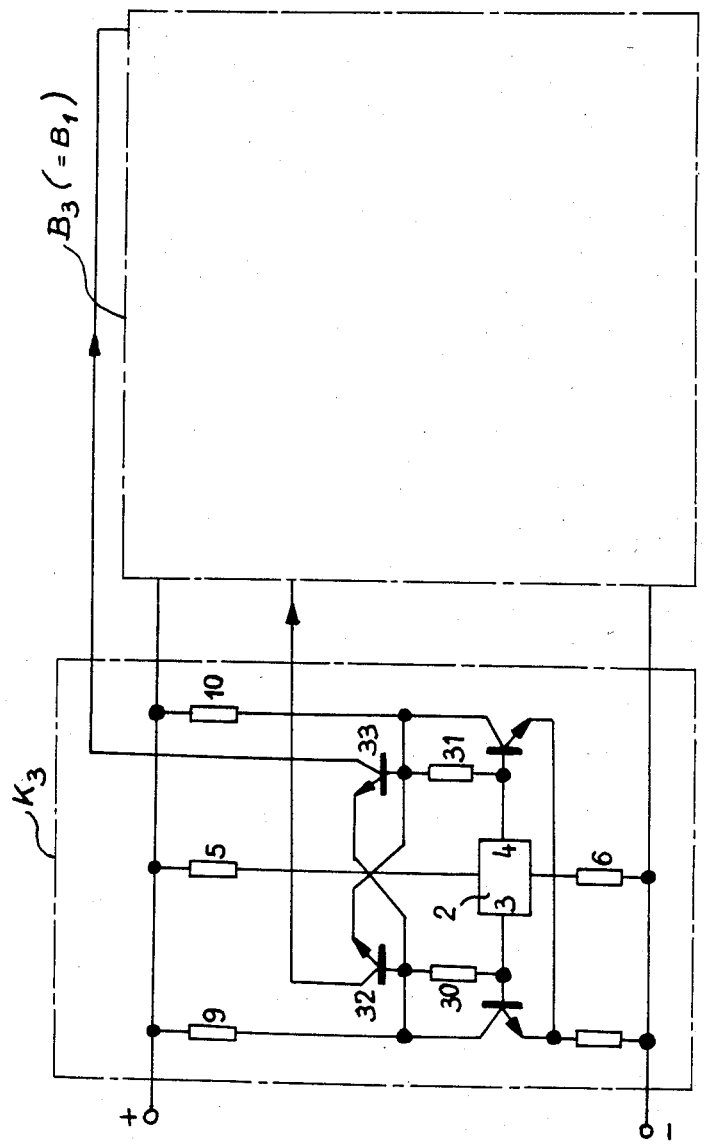
FIG. 3 shows a commutation circuit for temperature compensation of the control voltage.

In the design version as per FIG. 3, the temperature dependence of the Hall voltage generated by the Hall generator 2, is compensated by feedback via the resistors 30 or 31, so that the control voltages at the bases of the transistors 32 or 33, respectively, will essentially remain independent of the ambient temperature. Since the output voltage of the Hall generator $U_{Ho}$ will change by about 2%/K and the internal resistance of the Hall generator $R_{iH}$ will change by about 1.8%/K, the charge of the internal resistance will influence the amplification of the transistor 8, respectively in such a way that at a higher ambient temperature the lower Hall voltage will be amplified higher, in consequence of the lower internal resistance of the Hall generator and the lessened reverse feedback linked with it, and vice versa.

At the about equal Hall voltages at the outputs 3, 4 of the Hall generator 2, equal voltages are applied to the bases of the transistors 32, 33 so that by the crosswise connection of emitters and bases of the transistors, 32, 33, these, and thus the drive transistors 11, 12 and the final stage transistor pairs 13, 14 or 15, 16 respectively, are blocked.

A change in the Hall voltage at the output 3 of the Hall generator 2 in the sense of driving through the transistor 7 and the preceding concomitant change of the Hall voltage at the output 4, in the sense of blocking the transistor 8, will lead to driving through of the transistor 32, the drive transistor 12, and the final stage transistor pairs 13, 14. A drop in the Hall voltage at the base of the transistor 7, caused by the rotation of the armature, will have as consequence of blocking the transistor 32, the drive transistor 12, and the final stage transistor pairs 13, 14. Only the Hall voltage at the output 4 of the Hall generator 2, higher when compared to output 3, will lead to the driving through the transistor 33, the drive transistor 11 and the final stage transistor pairs 15, 16. Since the changes in the Hall voltage at the outputs 3 and 4 of the Hall generator 2 depend upon changes in the position of the rotor, and are thus time-bound, it is ensured that the two final stage transistor pairs 13, 14 and 15, 16 are blocked shortly before the moment of commutation, which will prevent shorting of the operating voltage at the moment of commutation despite the alternating driving through of the final-stage transistor pairs.

Speed regulation during fluctuations in the operating voltage, or use of the motor with the same circuitry for wide ranges of the operating voltage, is possible by using of known voltage control circuits. Since, however, this type of adaptation will generally bring additional losses, which is especially undesirable with battery-operated equipment, various advantageous regulating circuits are described below.

Figure 4:
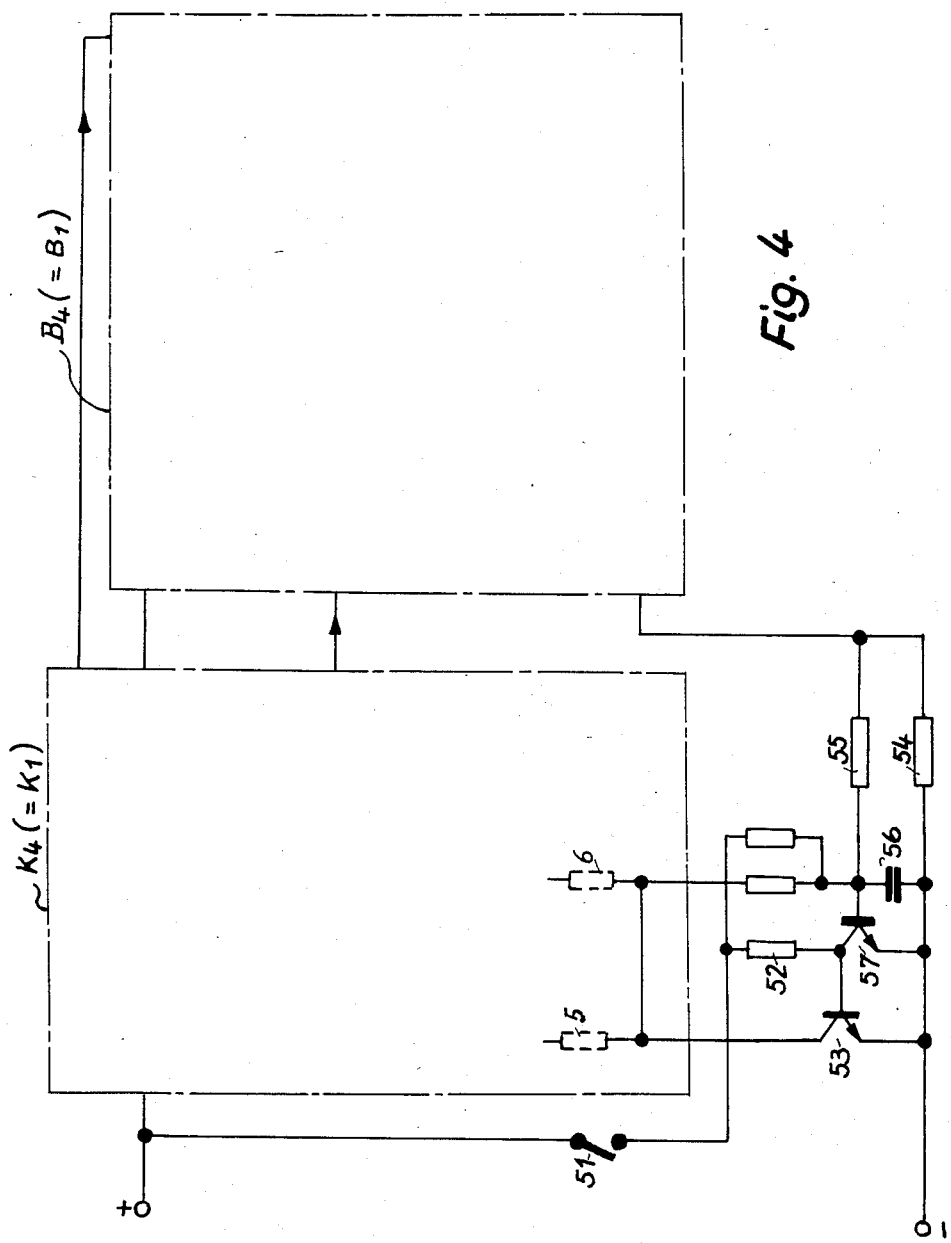
FIG. 4 shows a commutation circuit as per FIG. 1 with stator-current limitation.

In FIG. 4 closing the switch 51 will cause driving-through the transistor 53, so that voltage is applied via the resistors 5, 6 to the Hall generator 2 and driving the final stage transistor pairs 13, 14 or 15, 16, respectively, can be made, as described in FIGS. 1 to 3.

For the limitation of the current, a low-ohm resistor 54 is arranged in series with the stator winding 1, so that the voltage resulting from the current at the resistor 54 will charge the capacitor 56. When the voltage at the capacitor 56 attains the value necessary for driving through the transistor 57 this will lead to blocking the transistor 53 and thus to blocking the transistors 7, 8 the transistor pairs 11, 12 and the final stage transistor pairs 13, 14 and 15, 16, respectively.

The beginning discharge of the capacitor 56 via the resistors 54 and 55, will lead to blocking the transistor 57, subsequent driving-through the transistor 53, and in consequence to a flow of current in the stator winding 1 depending upon the voltage at the outputs 3, 4 of the Hall generator 2. This current flow in the stator winding 1 will charge anew the capacitor 56 and repeat the already described blocking of the final stage transistor pairs 13, 14 and 15, 16, respectively.

The point of the onset of this regulation of the motor current caused by blocking the final stage transistor pairs will, in the normal case, lie at the lower limit of the range of the operating voltage. A rise in the operating voltage will bring about a correspondingly higher number of blocking sequences, so that the advantage is realized of the peak values of the motor current not depending upon the magnitude of the operating voltage but being influenced solely by the buildup time of the current rise. Charging the capacitor 56 up to the value necessary for switching through the transistor 57 will, at higher operating voltages, thus merely lead to an increased number of blocking impulses per time unit. The aforegoing makes it possible that the power absorption in the stator winding 1 of the motor will be constant within wide limits.

This applies in the same way to the starting of the motor, so that also with motors of a high efficiency, and thus small ohmic resistance of the stator winding 1; the starting current will be equivalent to the continuous operation current.

Selection of the final-stage transistors, is thus made according to the value of the continuous operating current. For motors of higher output, the final-stage transistor pairs 13, 14 and 15, 16 respectively are in case of need to be replaced by Darlington transistors to obtain the required higher amplification.

Instead of switch 51, a control member, f.i. in the form of a CPT resistor or a photo transistor may be provided, to stop the motor if required by temperature or by optical signals. the control current is here of an advantageously small magnitude.

Figure 5:
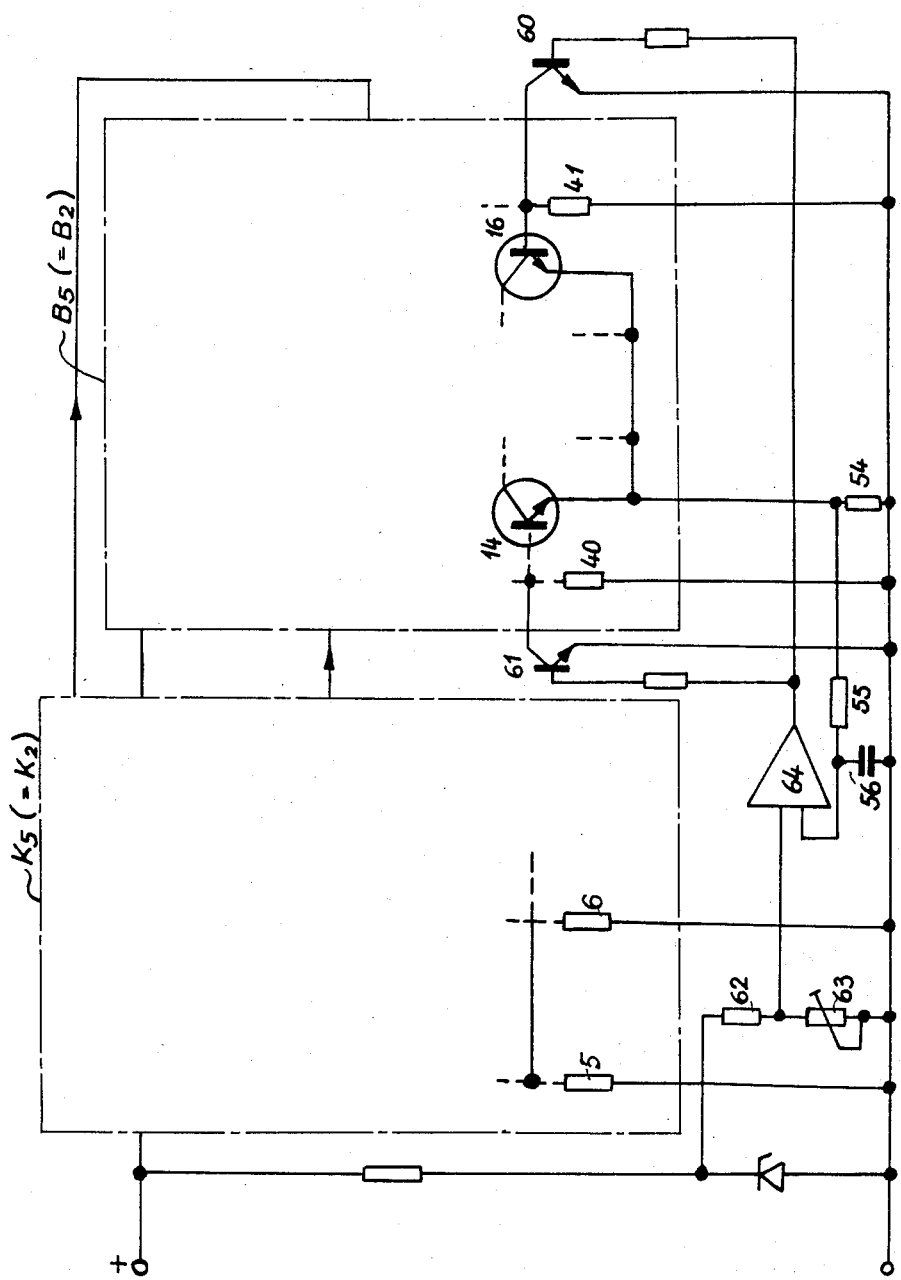
FIG. 5 illustrates a commutation circuit as per FIG. 2 with adjustable reference voltage for stator-current limitation.

FIG. 5 shows a control circuit in which the blocking impulses are used directly for the blocking of one respective transistor of the final stage transistor pairs 13, 14 or 15, 16, respectively. This one-sided blocking of the branch will cause the magnetic energy stored in the stator winding 1, which is transforming itself into electric energy, to be changed via the non-blocked transistor 13 or 15, respectively of the final stage transistor pair. The voltage present herein is, contrary to the voltage as per FIG. 4, of limited magnitude since few components are present as resistors within the short circuiting network and for the flow of the short circuit current it is not necessary first to reach the operating voltage. Further advantageous applications of the motor result herefrom, since with small expenditure as to circuitry, the radio interference voltage can be kept within the prescribed limits.

As shown in FIG. 4, the current in the stator winding 1, is applied as voltage at the resistor 54 for current limitation during starting and continuous operation, i.e., this voltage will charge the capacitor 56 and cause, via the operational amplifier 64, switching through of the transistors 60 and 61 in case that the voltage at the capacitor 56 exceeds the value of a reference voltage set at the voltage divider 62, 63. Switching through of the transistors 60 and 61 will block both transistors 14 and 16, so that the stator winding 1, will be no longer connected to the operating voltage and only the discharge current of the capacitor 56 can be measured at the resistors 54 and 56. If the voltage at the capacitor 56 drops to the present value, the transistors 60, 61 are blocked via the operational amplifier 54, so that by driving the drive transistors 11 or 12, respectively, and the final stage transistor pairs 13, 14 or 15, 16, respectively, current will flow through the stator winding 1. The incidence of the blocking impulses from the stator current depends upon the reference voltage set at the resistor 64, the operating voltage, and upon the components that come under the time constant.

Exceeding the advantage of FIGS. 4 and 5, the arrangement as per FIGS. 6 and 7 provides not only for regulation of the current in the stator winding, but also combines here, via a monostable pull-out stage 72 the speed regulation for the motor. Control impulses from the drive transistors 11, 12 are led via the diodes 70, 71 to the monostable pull-out stage 72, which is triggered when both drive transistors 11, 12 are blocked. This is the case at the respective moment of commutation.

After every triggering impulse, a voltage of constant value is available at the output 73 of the monostable pull-out stage, charging the capacitor 74 via the resistor 75. After a fixed preset time, derived from the predetermined speed of the motor, the monostable pull-out stage 72 will fall back into its stable switching position and the capacitor 74 will discharge until renewed triggering, i.e. until the moment of blocking of both transistors 11, 12. As long as the voltage at the capacitor 74 is above the value of the voltage at the capacitor 56, the operational amplifier 54 will block the transistors 60 and 61.

As in FIGS. 4 and 5, the voltage at the capacitor 56 is derived from the voltage at the low-ohm resistance 54. If the voltage at the capacitor 56 rises above the value at the capacitor 74, the transistors 60 and 61 are switched through via the operational amplifier 54 and thus the driven-through transistor 14, 15 or 16 respectively of the final stage transistor pairs 13, 14 or 15, 16 respectively, is blocked and the current in the stator winding 1 interrupted. By this, the capacitor 56 will discharge via the resistors 54 and 55, so that after a short time the transistors 60 and 61 will be blocked and current will flow again in the stator winding 1. The voltage at the capacitor 74, serving as reference voltage for speed regulation, is stabilized to a great extent against fluctuations in the operating voltage and changes in the ambient temperature, so that current interruptions in order to limit the current in the stator winding 1, are initiated by a comparison of the voltages at the capacitors 56 and 74.

Since the control voltages for the control of the final stage transistor pairs 13, 14 and 15, 16 may optionally be obtained as per FIGS. 1 to 3, and regulation of the current or the speed respectively can be made as per FIGS. 4 to 6, favorable solutions for the control circuit are available for these applications. Components that are identical as to their function, bear identical reference numbers.

Figure 8:
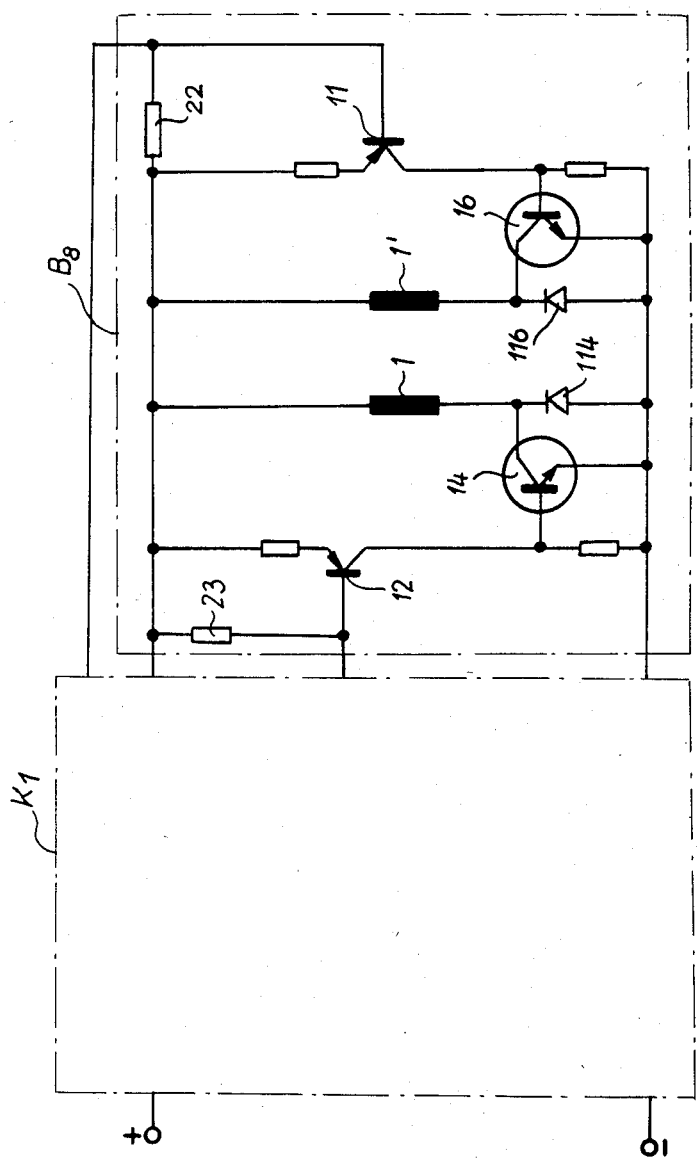
FIG. 8 is a modified version of the design with the bridge being a composite design of semiconductor switches and coils.

In the modified design version as per FIG. 8, a composite bridge consisting of the final stage transistors 14, 16 and two stator coils 1,1', is provided instead of a full bridge with semiconductor switches. It is to be understood that the bridge network as per FIG. 8 may be combined, if desired, with the commutating circuit K2 or K3 or with circuit designs as per FIGS. 4, 5 or 6. The composite bridge network as per FIG. 8 will ab initio avoid short circuits. The simultaneous blocking of both bridge halves in the zone of the moment of commutation is, however, of advantage also here and especially relative to a good degree of efficiency of the motor, because this avoids application of current to the motor winding arrangement in the ineffective intermediate zone of the field and unnecessary transformation of current into heat.

I claim:

1. An electronic power supply for a commutatorless DC motor which consists of (a) a permanently magnetized rotor with north and south poles and a magnetic field,
(b) a stator winding arrangement consisting of only a single stator winding with two opposed ends,
(c) a rotor position sensing arrangement consisting of only a single stationary field sensor which responds to said magnetic field to produce a signal having a first magnitude in response to a north pole, a second magnitude in response to a south pole, and at least a third magnitude in response to a transistor between such poles, and
(d) means for producing a reluctance torque at least during the gaps of the electromagnetic torque generated by the interaction of said rotor magnetic field and said stator winding, consisting of
only a single bridge cooperating with said single stationary field sensor and having four bridge arms each including a semiconductor switch, the bridge arms being interconnected at a first junction, a second junction, a third junction and a fourth junction to form a bridge network, which bridge network can be so connected that the first and second junctions are each connectable to an individual one of two opposed sides of a DC source and the third and fourth junctions are each connectable to an individual one of the ends of the stator winding; and
a control circuit connecting the semiconductor switches and the field sensor together and operating in a manner that when the sensor produces a signal of the first magnitude, a first pair of semiconductor switches will become conductive and current will flow through the stator winding in a first direction, when the sensor produces a signal of the second magnitude, a second pair of semiconductor switches will become conductive and current will flow through the stator winding in a second direction opposed to the first direction, and when the sensor produces a signal of the third magnitude, all semiconductor switches will become non-conductive and current will cease to flow in the stator winding.

2. The power supply of claim 1, wherein said field sensor is a Hall generator.

3. The power supply of claim 1, wherein said control circuit comprises a non-linear amplifier.

4. The power supply of claim 1, further comprising a current limiter limiting the flow of current through said stator winding by intermittently rendering each of said first and second pairs of semiconductor switches non-conductive.

5. The power supply of claim 1, further comprising a speed regulator regulating rotation speed of said rotor by intermittently rendering each of said first and second pairs of semiconductor switches non-conductive.

6. The power supply of claim 2, further comprising a temperature compensation circuit connected to said Hall generator and operating in a manner that said field sensor signal is made substantially independent of temperature.

* * * * *